United States Patent
Schmidt (10) Patent No.: US 7,539,627 B2
(45) Date of Patent: May 26, 2009

(54) SYSTEM AND METHOD FOR FORECASTING WORKLOAD AND RESOURCE REQUIREMENTS IN A CALL CENTER/HELP DESK

(75) Inventor: Hans-Joerg Schmidt, Frienstedt (DE)

(73) Assignee: International Business Machines Corporation, Armonk, NY (US)

( * ) Notice: Subject to any disclaimer, the term of this patent is extended or adjusted under 35 U.S.C. 154(b) by 1156 days.

(21) Appl. No.: 10/256,191

(22) Filed: Sep. 26, 2002

(65) Prior Publication Data

US 2003/0065548 A1 Apr. 3, 2003

(30) Foreign Application Priority Data

Sep. 28, 2001 (EP) .................................. 01123402

(51) Int. Cl.
*G06F 9/46* (2006.01)
(52) U.S. Cl. ........................................................ 705/9
(58) Field of Classification Search .................. 705/9
See application file for complete search history.

(56) References Cited

U.S. PATENT DOCUMENTS

| | | | | |
|---|---|---|---|---|
| 5,185,780 A * | 2/1993 | Leggett | ................ | 379/265.08 |
| 5,325,292 A * | 6/1994 | Crockett | ........................ | 705/9 |
| 5,544,281 A * | 8/1996 | Maruoka et al. | ............... | 706/58 |
| 5,668,944 A | 9/1997 | Berry | ........................ | 395/184 |
| 5,911,134 A * | 6/1999 | Castonguay et al. | ............ | 705/9 |
| 6,115,693 A * | 9/2000 | McDonough et al. | ......... | 705/10 |
| 6,324,282 B1 * | 11/2001 | McIllwaine et al. | .... | 379/265.06 |
| 6,330,326 B1 * | 12/2001 | Whitt | .................... | 379/265.13 |
| 6,473,084 B1 * | 10/2002 | Phillips et al. | .............. | 345/440 |
| 6,584,191 B1 * | 6/2003 | McPartlan et al. | ..... | 379/265.02 |
| 6,611,726 B1 * | 8/2003 | Crosswhite | .................. | 700/99 |
| 6,850,613 B2 * | 2/2005 | McPartlan et al. | ..... | 379/265.02 |
| 6,853,721 B2 * | 2/2005 | Mengshoel et al. | .... | 379/265.06 |
| 6,928,398 B1 * | 8/2005 | Fang et al. | ..................... | 703/2 |
| 6,970,829 B1 * | 11/2005 | Leamon | ......................... | 705/9 |
| 7,085,728 B2 * | 8/2006 | Sarlay et al. | .................. | 705/9 |
| 7,103,562 B2 * | 9/2006 | Kosiba et al. | ................. | 705/10 |
| 2002/0052770 A1 * | 5/2002 | Podrazhansky | ................ | 705/7 |

OTHER PUBLICATIONS

Corbett, Michael F., Using quantitative analysis to plan and manage IS support functions Journal of Systems Management, vol. 41, No. 11, Nov. 1990.*

(Continued)

*Primary Examiner*—Scott L Jarrett
(74) *Attorney, Agent, or Firm*—William Steinberg, Esq.; Victor A. Cardona, Esq.; Heslin Rothenberg Farley & Mesiti P.C.

(57) ABSTRACT

Computerized systems and methods for managing a workload varying in time applicable to a help desk. A future workload is forecast from historical workload data. A first analysis result is built on an earlier section of historical data, and a second analysis result is built with more recent historical data. The two results are combined to yield a workload forecast. Further, the resources needed for covering a forecast workload value are calculated automatically by equating generic expressions for the resources demanded for servicing the forecast workload and the resources offered for handling the workload.

20 Claims, 6 Drawing Sheets

OTHER PUBLICATIONS

Hughes, Colette, Four steps for accurate call-center staffing HRMagazine, vol. 40, No. 4, Apr. 1995.*

Brigandi, Anthony John, OR applications in call center operations Polytechnic University, Jan. 1995, UMI Order No. 9517865.*

Klungle, Roger et al., Call Center Forecasting at AAA Michigan The Journal of Business Forecasting Methods & Systems, vol. 16, No. 4, Winter 1997/1998, pp. 8-13.*

Reynolds, Penny, Automating for Better Workforce Management Call Center Solutions, vol. 17, No. 9, Mar. 1999, pp. 74-80.*

PrimeTime F&S User's Guide—Version 1.3 Blue Pumpkin Software, Inc., 1997-1998.*

Blue-Pumpkin.com Web Pages Blue Pumpkin Software, Inc., Jan. 28, 1998, Retrieved from Bibalex.org Jun. 19, 2005.*

Blue-Pumpkin.com Web Pages Blue Pumpkin Software, Inc., Apr. 21, 1998, Retrieved from Bibalex.org Jun. 19, 2005.*

Blue Pumpkin.com Web Pages Blue Pumpkin Software, Inc., Mar. 2, 2000, Retrieved from Bibalex.org Jun. 19, 2005.*

Chen, Chung et al., Forecasting Time Series with Outliers Journal of Forecasting, vol. 12, No. 1, Jan. 1993.*

Bianchi, Lisa et al., Forecasting Incoming call to telemarketing centers The Journal of Business Forecasting Methods & Systems, vol. 12, No. 2, Summer 1993.*

Hughes, Colette, Four steps for accurate call-center staffing HRMagazine, vol. 40, No. 4, Apr. 1995.*

Bassin, William et al., How to improve the realism of forecast error The Journal of Business Forecasting Methods & Systems, vol. 14, No. 3, Fall 1995.*

Ord, Keith et al., Automatic forecasting THe American Statistician, vol. 50, No. 1, Fall 1996.*

Thompson, Gary M., Labor Scheduling Part 1: Forecasting Demand Cornell Hotel and Restaurant Administration Quaterly, vol. 39, No. 5, Oct. 1998.*

Thompson, Gary M., Labor Scheduling Part 2: Knowing How Many On-Duty Employees To Schedule Cornell Hotel and Restaurant Administration Quaterly, vol. 39, No. 6, Dec. 1998.*

Reynolds, Penny, The science of call center management Communication News, vol. 35, No. 10, Oct. 1998.*

Perry, Chris, Short-Term Load Forecasting using Multiple Regression Analysis REPCON, 1999.*

Tashman, Leonard, Out-of-sample tests of forecasting accuracy: an analysis and review International Journal of Forecasting, vol. 16, 2000, pp. 437-450.*

Lawrence, Michael et al., Sales forecasting updates: how good are they in practice? International Journal of Forecasting, vol. 16, 2000, pp. 369-382.*

Autobox 5.0 For Windows Reference Guide Automatic Forecasting Systems, May 1999.*

Brown, Robert G. et al., The Fundamental Theorm of Exponential Smoothing Operations Research, vol. 9, No. 5, Sep./Oct. 1961.*

Gardner, Everette S., A Simple Method of Computing Prediction Intervals for Time Series Forecasts Management Science, vol. 3,4 No. 4, Apr. 1988.*

Baines, Anna, Management Forecasting Work Study, Jul./Aug. 1992, vol. 41, No. 5.*

Taylor, James W. et al., A Quantile Regression Approach to Generating Prediction Intervals Management Science, vol. 45, No. 2, Feb. 1999.*

Stanislav, Kaleta et al., Experience with FIR BP neural networks for predicting problems Advances in Neural Networks and Applications Advances in Neural Networks and Applications, 2001, Abstract.*

Durr, Bill, Inbound scheduling nightmares: Cursing the darkness or lighting a candle Telemarketing, vol. 12. No. 7, Jan. 1994.*

Andrews, Bruce H. et al., L.L. Bean Improves Call-Center Forecasting Interfaces, vol. 25, No. 6, Nov.-Dec. 1995.*

Cleveland, Brad, Fortifying work load forecasts Teleprofessional, vol. 12, No. 6, Jun. 1999.*

Klenke, Maggie et al., Modeling Multimedia call-center traffic Business Communications Review, vol. 31, No. 10, Oct. 2001.*

Pipkins—Maxima Advantage Web Pages Pipkins.com, May 1998, Retrieved from Archive.org Oct. 10, 2006.*

* cited by examiner

SYSTEM AND METHOD FOR FORECASTING WORKLOAD AND RESOURCE REQUIREMENTS IN A CALL CENTER/HELP DESK

FIELD OF THE INVENTION

The present invention relates generally to computerized systems and methods for managing a workload varying in time. In particular, it relates to such methods and systems which concern daily and weekly variability and a business environment having a number of resources, in particular computer devices and staff that are concerned with covering the workload.

BACKGROUND

Although the present invention may be applied in many technical fields in which a time-variable entity is processed by providing a number of resources varying in time, the invention will be described with reference to a business environment such as a call center or a User Helpdesk (UHD), where the varying workload is defined by a varying number of incoming calls or e-mail correspondence or any other type of user-initiated requests.

Figure 1:
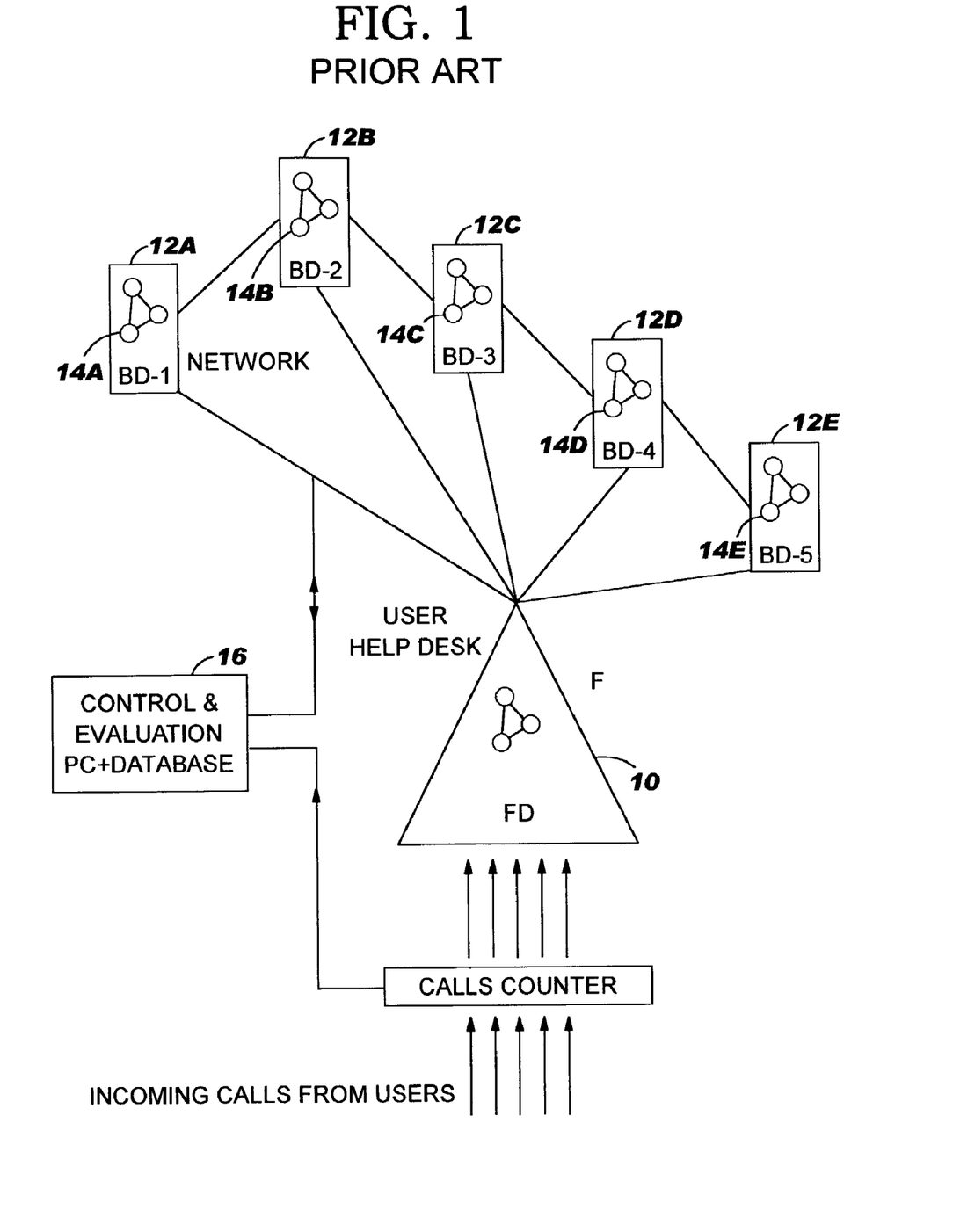
FIG. 1 is a schematical representation giving an overview of an exemplary structure of a User Helpdesk (UHD) configuration (prior art)

Such a situation is structurally depicted in the schematic representation of FIG. 1 with special reference to a User Helpdesk. In general, resources 14A-14F provided for satisfying the varying workload of incoming calls can be any devices arranged for operating successfully with the workload. In the application field mentioned above, the resources 14 are in particular phone call answering staff and computing/phone units such as personal computers having integrated phone devices that the staff works with. Usually, this happens in a networked environment, which provides the possibility to include a plurality of geographical locations in the UHD, the staff of which may be combined to cover a given, current UHD workload.

Often, the inner structure of a User Helpdesk comprises staff in a "Frontdesk" area 10 that connects to a specialist staff member working in a Backdesk area 12A-12E according to a respective subject matter of a given user problem. A personal computer 16 is coupled to the User Helpdesk configuration so that it is able to track the number, time and duration of incoming calls in order to store such statistical data and to provide a computational base for repeated and possibly permanent workload evaluation with permanently updated prognosis.

An example of such a method and system is disclosed in U.S. Pat. No. 5,911,134.

The aforementioned patent addresses the problem of insufficient flexibility of workload forecast systems that are unable to give a quick and accurate response to changing boundary conditions in order to forecast future call loads and to provide a realistic scheduling of staff, in order to meet the dynamic load requirements of, for example, a telephone call center.

Instead of time-series forecasting the workload in large blocks of time and then using fixed factors to decompose a monthly forecast into weekly, daily and hourly increments, the U.S. patent teaches subdividing a team of agents into management units (MU) which may be generally located at different physical locations but which may cooperate with each other in order to satisfy workload peaks, for example. Further, the patent proposes using real-time performance statistics and displaying agent schedules to improve efficiency.

A force management system according to U.S. Pat. No. 5,911,134 uses a central computer to manage the cooperation of the management units and to keep track of staffing changes. Staffing changes are transmitted from a local team to the centralized computer, which regularly issues updated working schedules to the management units. The prediction algorithm is based on the Erlang C method modified by some variation or optimization of the required staff by weighted average factors.

The method of U.S. Pat. No. 5,911,134, although covering seasonality and calendar factors in order to adapt the fluctuations of different seasons and calendar-based characteristics, is not precise enough and not flexible enough to predict a future workload in a satisfying manner. Further, the approach proposed therein is not general enough for integrating other important parameters required for providing a satisfying prediction, as for example the different skills of staff, the differences between Frontdesk work and Backdesk work, the effects of training courses completed by the staff and in particular the trend which has been set in the varying workload time series data by the most recent past.

SUMMARY

It is thus an objective of the present invention to provide a computerized method and system for managing a demanded workload in a business environment with increased accuracy and decreased prediction time.

The present invention provides a computerized method for managing a demanded workload in a business environment in which the workload varies by time of day and by day of week and is to be managed with a variable number of resources offered by an enterprise, the resources including in particular computing devices, telephone equipment, and staff.

This method comprises the step of generating a workload forecast from historical workload data in a workload calculation model, and is characterized by the steps of:

a.) calculating at least one model component, e.g., the call volume and/or the call servicing time, of a plurality of components constituting the workload in a predetermined future time interval, as e.g., Tuesday, 10.00 to 10.30, a.m., from respective historical workload component data associated with the same time and the same day of a plurality of weeks, b.) calculating a first analysis result on a first plurality of historical component data covering an earlier section—time1—of history, c.) calculating a second analysis result on a second plurality of historical component data covering a later section—time2—of history, d.) combining the first and second analysis results to yield a respective combined workload forecast value, and e.) optimizing the combined value by variation of the length of the later section—time2—of history.

The workload may be exclusively staff-requiring, but in most situations the workload processing comprises the use of devices, as well, for example phone devices. In a preferred application of the invention to staff scheduling of a Call Center or a User Helpdesk these devices are preferably telephone equipment, PCs, and staff.

In the underlying mathematical workload forecast model, the workload is characterized by a plurality of components. Two important components in view of workloads in Helpdesk environments are the number of incoming calls and the average call duration.

Basically, the historical workload data may be generated by tracking the number of incoming calls and their durations, or other means adapted to the respective nature of workload. Incoming calls can, for example, be easily counted by software running in a server computer integrated into telephone equipment. Further, the duration of a call can be tracked and stored in the historical workload data, advantageously accompanied with separate Backdesk call duration, and possibly an index for a respective Frontdesk or Backdesk staff member being active in a call. This helps to provide data for an elaborate evaluation selectively directed to an optimized planning. This helps identify problems related to misforwarded calls between Frontdesk and Backdesk staff.

A high quality forecast can be provided by applying, preferably per component, the inventive approach of combining two different analysis results, one representing a forecast value calculated on a long time base, and another representing the more recent history into a result and optimizing this result by variation of the latter time section. For example, variation may be provided by stepwise extending the time section from the two last weeks to cover the last three weeks, then four weeks, and so forth. In most cases, an optimum forecast value can be achieved which reflects the fact that a future incoming workload may often be predicted by superimposing the two effects, a larger and a smaller time scale effect.

According to the invention, classical regression analysis is proposed to yield lines as respective minimum deviation lines. It should, however, be stressed that mathematical means other than classical regression analysis for extending historical data into the future may also be used for yielding the two different results.

Useful examples are genetic algorithms which generate a forecast value based on historical data, while the forecast value is repeatedly compared to a once-future point in time now passed, which of course is also part of the stored history data. Further algorithms are disclosed in the literature concerning stock exchange projection methods, for example.

Amongst others, the workload can be basically forecast in two different ways. The first one uses two different regression analysis runs on call volume and call servicing time and combines the results after regression. The second one combines the quantities before doing a single regression analysis.

The preferred method comprises the step of performing a regression analysis method as mentioned above, or an equivalent thereof for the incoming call volume, and a separate second regression analysis on the respective sum of call servicing time, both done in preferably 30 minutes intervals. Then, an empirical formula is used for calculating the resulting sum of the workloads, optionally including the time needed for preparing a call or the post-call administration work of a call. The empirical formula should reflect the fact that call-related servicing time often decreases as the number of calls increases. The advantage of separately managing call volume and servicing time per call is that the UHD management may respond more selectively to business situations in which, for example, the staff talks too long per call. A management order could be issued to the UHD staff requesting shorter calls.

The other way is to basically rely on directly tracked and stored data for call volume and talking time when servicing the calls. Then, with optional inclusion of estimated call preparation time and post-call administration time, a compound quantity can be stored in a database describing the workload calculated from its several components. Then the regression analysis is done on this compound data, and a respective workload forecast value also results for every 30 minutes.

Further, when repeatedly tracking and storing current workload data, and repeatedly updating workload forecast values by integrating the current data into the calculation of future workload, an automated forecast method is found which is able to adapt itself to the current business situation without human intervention.

Basically, the historical workload data may be input manually or in an automated form into an evaluation computer dedicated to the forecast. However, the permanent tracking, storage and update of the historical data are advantageously integrated into the inventive system: The incoming workload is permanently tracked by control logic in a preferably combined control and evaluation computer or an equivalent telecommunications device. Historical data is preferably stored in a database, and forecast data is issued to a respective manager output interface, e.g., the screen of the computer. The manager can read the forecast value and may develop a staff schedule which comprises an optimum number of staff members for the prediction period.

Further, when generating a present/past fraction in which current-day real workload data is set in relation to respective historical data taken as an average over a predetermined historical time section, and when multiplying the forecast values with the present/past fraction in order to yield respective expected daily workload data, then, the youngest history data can be easily incorporated into the forecast system for adapting the forecast data to the history of the same day. Thus, a kind of additional Intraday forecast control is provided.

When the inventive method as described above is extended by the step of calculating an amount of resources needed for covering a forecast workload value by equating generic expressions for:

a.) the resources, e.g., staff-associated working time, demanded by the client for servicing a workload, and b.) the resources offered by the enterprise for handling the workload, then, a very general problem solution is found, and the basic inventive approach including its specific advantages can advantageously be exploited for generating a forecast value for the number of needed staff within a predetermined interval of time.

The resources referred to here are preferentially staff and devices needed to handle incoming calls in a call-center, or staff and devices needed to handle incoming calls in a User Help Desk.

When repeatedly collecting current call statistic data from a plurality of respective communication devices provided for the staff members, storing the call statistic data in a database, and evaluating the data for forecast purposes, then the UHD or Call center specific needs are specifically supported by the invention. The logic required for doing this may be implemented in a control program that polls the different end-devices provided for the staff and reads statistical data, stored there, like: call start and end time, day of week, date; an ID datum for the concerned subject matter; this may be input by the staff member himself or automatically generated in response to a specific, predetermined mapping between e.g., phone ID or staff member ID to a respective subject matter; optionally the staff ID. Other data may be added.

The control program is advantageously implemented according to the specific conditions present in the actual business environment. When a computer network is present and each staff member work place is controlled by a PC, for example, then the network server may poll this data from the plurality of networked client stations, for example in regular time intervals, e.g. every 30 minutes. When this is a Call Center with interconnected phone devices only and without an interconnecting PC network, then the control logic is advantageously implemented within the server phone device.

Such a device is usually present in multi-user telephone equipment having one or two centralized Frontdesk phones from which the incoming calls are forwarded elsewhere.

Further, the basic method according to the invention may be extended by the step of excluding outlier data within the historical workload data, lying out of predetermined tolerance limits, from analysis, in particular from regression analysis. This outlier data may originate from particular events, such as the issue of a new program version of a User Helpdesk support, which may cause many user questions and problems and thus many additional incoming calls. It will be appreciated by a person skilled in the art that excluding some outlier data from the historical database is of specific relevance to the mathematical means in use for prediction. In most cases excluding outliers helps to increase forecast quality.

Further advantageously, when including foreseeable events into the calculation of workload forecast, such events causing additional fluctuations overlying the forecast workload, then the forecast quality may be further increased for those "exceptional" situations which should not be neglected even though they might occur rarely. This can for example be done by adding a "delta" value to the prediction result reflecting the amplitude and length of the peak corresponding to the event. Positive and negative fluctuations, or even fluctuations having unusual characteristic peak patterns, may then be processed.

An example of an event causing a simple form of positive fluctuation of incoming calls is the above-mentioned issue of a new program release, undertaken by the enterprise offering the User Helpdesk. An example of a general negative fluctuation is a working day forming a "bridge" between a holiday and the next weekend.

Another way to increase long term forecast quality is to include a model parameter into a mathematical workload forecast algorithm that simulates the effects of training-based, increased staff efficiency in servicing incoming calls. This is applicable after a staff member has passed a training course on a given subject relevant to servicing the calls.

Forecast quality may be further increased by including a model parameter into the mathematical workload forecast algorithm that reflects the actual availability of a staff member for servicing incoming calls due to staff absence factors like illness, vacations, absence due to training courses and other reasons.

The inventive concept can be extended to include a model parameter within a mathematical workload forecast algorithm that reflects the length and amplitude of peaks beyond a uniform distribution within the daily workload distribution. Thus, a respective additional need of staff can be defined and be superposed to an existing forecast value in order to meet contractual provisions for accessibility of the Call center or the Helpdesk.

BRIEF DESCRIPTION OF THE DRAWINGS

The present invention is illustrated by way of example and is not limited by the shape of the figures of the drawings in which.

DETAILED DESCRIPTION

With general reference to the figures the basic inventive approach for calculating a workload forecast will be described in more detail. This is done for an exemplary User Helpdesk (UHD) configuration as shown in FIG. 1. The forecast calculation algorithm is primarily dedicated to increasing the short-time prediction accuracy of future workload with the particular additional aspect of reflecting the strong dynamics of the distribution of incoming calls.

According to the inventive method and system, historical data describing the number, the time, the duration of incoming calls, and their routing within the UHD, and so forth, is stored in a relational database coupled to the evaluation PC 16. The time base in which data is structured is preferably thirty minutes, i.e. a data set exists for each working day of a year which specifies a plurality of subsections which each hold the above-mentioned data which was in turn collected during half an hour. Of course, other time steps can be applied as well. Thus, for example, the first subsection comprises the time from 9.00 a.m. to 9.30 a.m., the next subsection covers the historical data collected between 9.30 a.m. to 10.00 a.m., and so forth. The number of subsections per day is dependent on the hours of business per day, offered to the clients.

Figure 3:
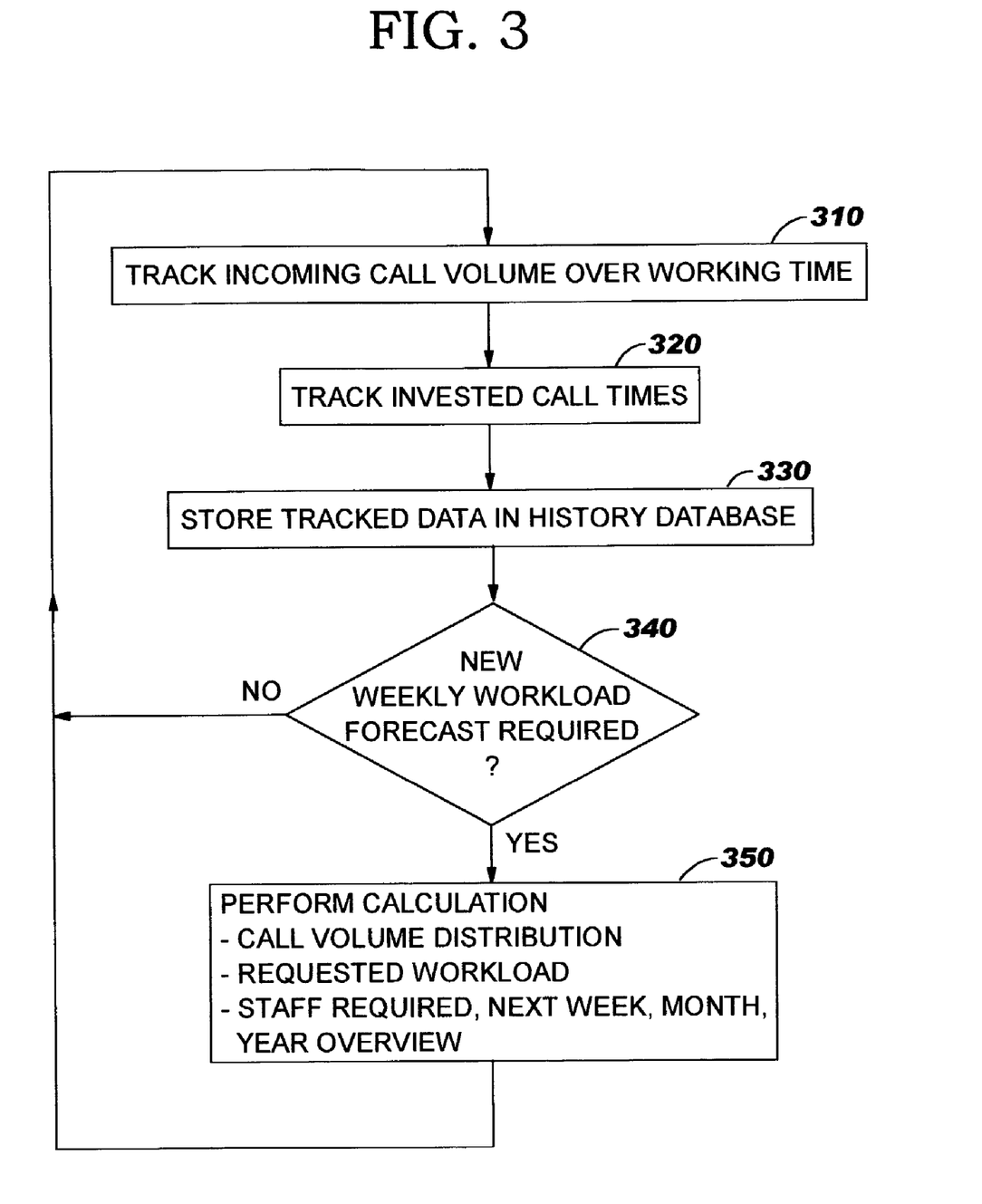
FIG. 3 is a schematical overview representation illustrating the control flow of an inventional embodiment.

A program implementing the inventive approach of workload forecasting runs on the evaluation PC 16, which acts as a network server as well. With reference to FIG. 3, which shows an overview of the control flow of an inventive embodiment of the workload forecast method, the basic steps and control are described in more detail below.

In a first step 310 incoming calls are counted and the corresponding statistical data is gathered concerning day of the week, start time of the incoming call, end time at Frontdesk, start-servicing time at Backdesk, and end-servicing time of Backdesk processing and an indication at which of the different Backdesk teams 1, . . . 5 and which staff member were involved. As this is a PC-networked environment it is easy to implement, e.g., in the form of a small polling program residing at the server 16.

Further, the complete workload is tracked along with the aforementioned data in the same data set. This includes organizational data that indicates which staff member was occupied at which time and for how long with an incoming call, step 320. Then this tracked data is stored in the history database, connected to the evaluation PC 16. The incoming calls are persistently tracked. For every thirty-minute interval, the data set is completed by collecting all required data from the plurality of Backdesk units and the plurality of Frontdesk units. Thus, the evaluation PC 16 is networked with the Frontdesk and the Backdesk PCs, in this preferred embodiment.

Further, a decision 340 determines whether a new workload prognosis run is required or not. In the depicted embodiment, a new, up-to-date workload forecast run may be started either automatically or triggered by manual interaction, for example by service staff concerned with drafting staff schedules. A sample repetition time interval can be set, for example to one week, or different according to the individual business in question.

If the NO-branch of decision 340 is entered, flow will branch back to step 310 for a repetition of the steps. Otherwise, (YES-branch), a new forecast run will be started on the base of the most recent data and with the currently valid selection of parameters involved in the workload forecast.

According to this embodiment of the invention, a basic step is to forecast the incoming call volume distribution on a thirty minute time base for any given future point in time, including the current day.

According to another aspect of the present invention, the requested workload distribution is forecast as well. According to a further aspect, the requested number of staff is calculated for a freely selectable future time, or time period, such as calculation for today, calculation for next week, calculation for next month, etc. Those calculation steps are performed in a block 350, the details of which are later described in more detail with reference to FIG. 4.

When a forecast run has been completed, the results are stored within the database. The results can be visualized on PC 16 or on a Personal Computer allocated to management staff.

Further, advantageously the team members may be moved from one Backdesk compartment to another when the program evaluation shows that, for example, a particular Backdesk compartment is experiencing too many incoming calls so that the workload is too high for the present staff. Thus, a re-allocation of staff can be advantageously initiated or either automatically or by interaction of management staff.

Thus, after forecast calculation, flow returns to step 310.

Figure 2:
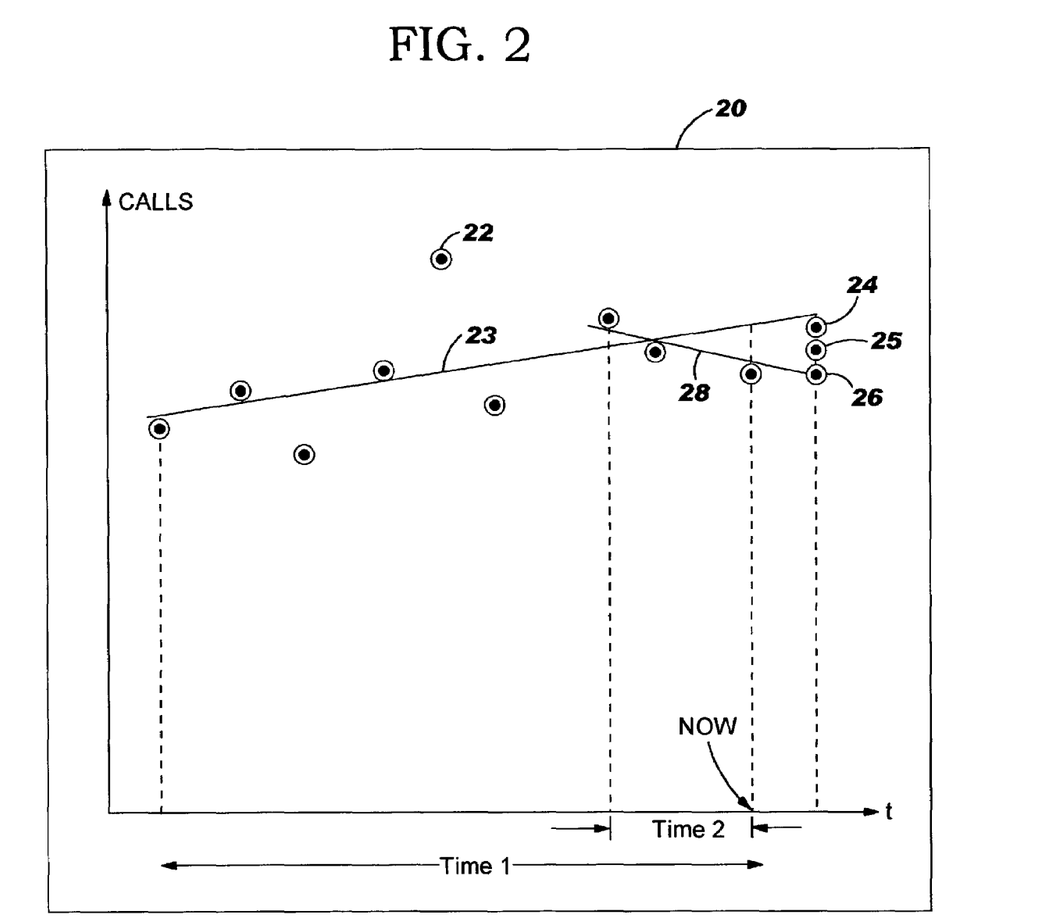
FIG. 2 is a schematical representation illustrating the combined regression forecast calculation according to the invention.

With detailed reference now to FIG. 2 a schematic impression 20 is given of the number of incoming calls (Y-axis) over time (X-axis), time increasing from left to right. Historical data values representing the number of incoming calls have X-coordinates beginning at the left margin of time interval time 1 which extends until the point in time corresponding to the present, i.e. "now". A second time interval time 2 is defined having the same end-time and a certain start-time which may be varied, for example weekly. The data depicted in the figure is assumed to represent the number of incoming calls of one particular thirty-minute interval always at the same day of a week, for example data collected in a sequence of Tuesdays, always between 10.00 a.m. and 10.30 a.m.

A first straight line 23 is defined by usual regression analysis in order to represent average values which may be used for predicting a forecast value for any future time. The first straight line 23 is defined as:

Calls=$m1 \times t + n1$.

Extrapolation, i.e., by projecting the straight line 23 to the future point in time for which the forecast shall be done, yields a first result 24 which is used as one of two components yielding the end-result for forecasting.

The second value 26 is obtained according to the present embodiment by building up a second straight line 28 which is a result of regression analysis over the above-mentioned second time interval time2. The straight line 28 is denoted as forecast=$0.5 \times (n1+n2)+(m1+m2) \times t$. Thus, regression analysis followed by extrapolation of the resulting straight line 28 yields a second result value 26.

According to the embodiment, both result values 24 and 26 are now combined to yield an effective forecast value 25. The arithmetic mean value is advantageously proposed for calculating the effective forecast value 25. i.e., if the extrapolation value 24 is 120 and the extrapolation value 26 is 80, then a value of (120+80)/2=100 will be calculated as a forecast value. This holds, however, only as a first approximation for the case in which the time2 interval is carefully selected.

According to a different, additional aspect of the present invention the length of the time 2 interval is varied and a minimum of standard deviation values is detected by the program in order to achieve a good forecast value.

Further advantageously, an upper limit and a lower limit are defined in order to exclude any outlier data, such an outlier data point 22 from a forecast calculation. This may be useful in cases in which, for example an irregularly increased number of incoming calls was tracked and stored which could be considered to be due to any specific event, as for example the release of a new software product supported by the User Helpdesk. Thus, such outlier data can be excluded from the calculation, on the one hand. On the other hand, however, such exceptional data may be explicitly added as an overlay value on a forecast value for a particular day at which the management staff plans a new event to happen, as for example the above-mentioned release of a new program version.

Figure 4:
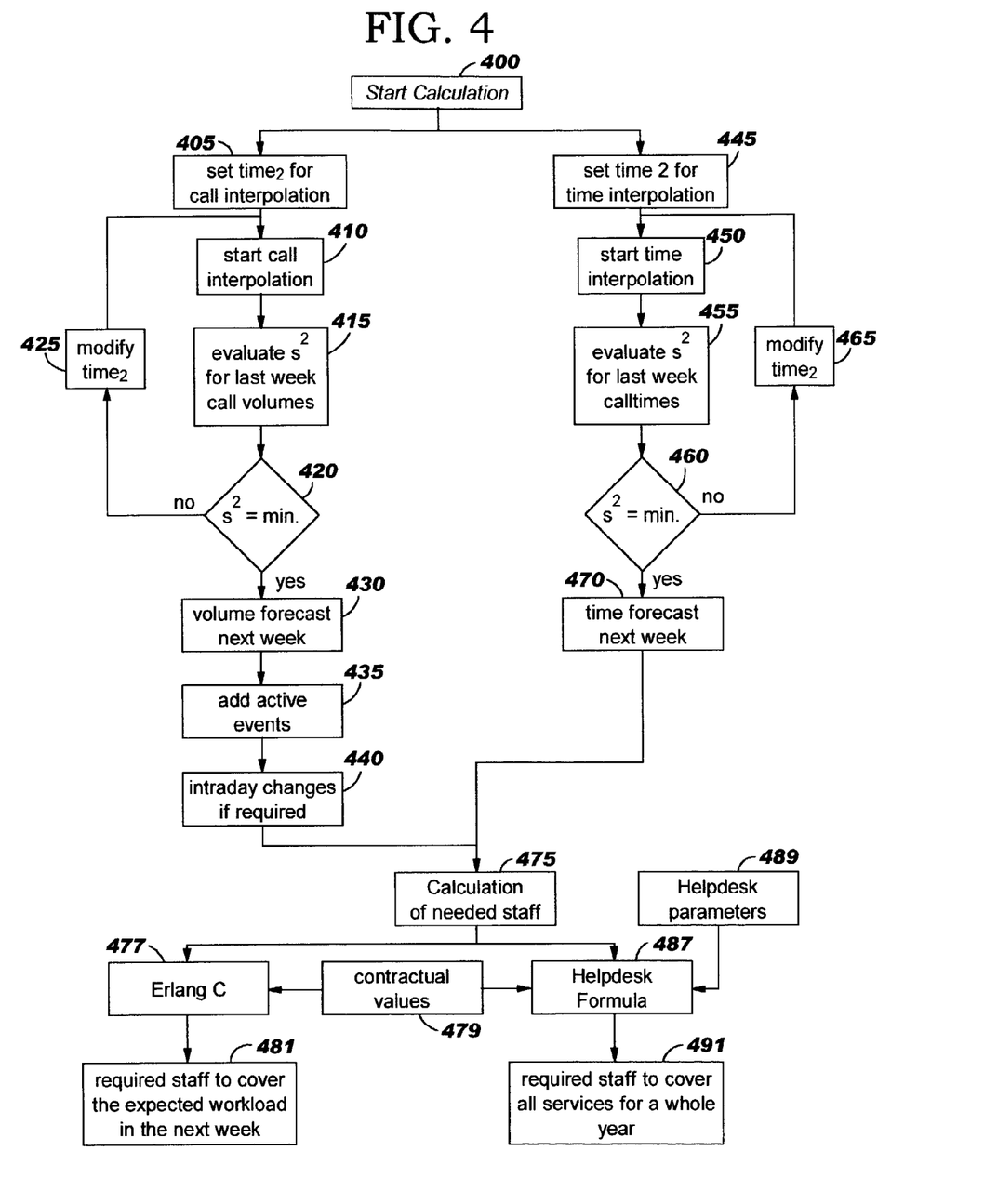
FIG. 4 is a schematical control flow representation giving additional details of block 350 in FIG. 3.

With additional reference now to FIG. 4 more details are given on the control flow according to a specific, preferred embodiment of an inventive method which first calculates a call volume forecast value which is valid for the next week, see steps 400 to 430, and which calculates the respective sum of servicing time needed for servicing the call volume for establishing a forecast value for the corresponding workload, see steps 445 to 470. Then, additional features can be appended in order to achieve particular further advantages, if desired. Thus, a calculation of staff required, for example, to cover the calculated workload during the next week is calculated, as well as the staff required to cover all services during a long period of a whole year is calculated with particular reference to contractual provisions concerning accessibility in the sense of end user availability of the help desk, and other help desk parameters.

In particular, in step 400 any initial work is done that is required for the calculation of call volume forecast values (left branch) and associated servicing times (right branch) involving each an optimization loop.

In a step 405 a value for time 2 is set quite near to the present, as e.g. one week before. Then, in a step 410 the call interpolation procedure is started yielding a pair of straight lines 23 and 28, i.e. interpolation lines. This may be done with classical regression analysis. Then, in a step 415 the standard deviation denoted as $s^2$ is calculated according to standard methods for both straight lines 23 and 28. The standard deviation value for the straight line related to the long time interval time 1 is just stored and does not influence the further calculations.

The standard deviation value related to straight line 28, i.e. related to time 2 and covering the more recently passed time interval is compared with an initial value which is explicitly set large in order to leave the check in step 420 via the NO-branch and to re-enter into step 410 with a new value for time 2 which is modified in step 425. Thus, the modification can for example be increasing time 2 for one week in order to include one more data point.

Then, with the newly defined time 2 interval steps 410 to 420 are run again and the new value of standard deviation is compared with the former one resulting from the preceding loop. This procedure is repeated until decision 420 is left through the YES-branch, which is an indication that a minimum value of the standard deviation for the time 2 section has been successfully found. Thus, both straight line 23 and the minimum straight line 28 are extrapolated into the "future" direction yielding values 24 and 26, respectively, for the same day in the next week. Those values 24 and 26 are combined to yield an average value 25 by the arithmetic mean, step 430.

Further, in a step 435 a check is made to determine whether any exceptional event (as mentioned above) is planned for the prediction day. If so, then an extra number of incoming calls is added to the combined value 25 which may be basically positive or negative, as well. Thus, for example, when the combined value 25 for the incoming call volume for next Tuesday is 200 and if the extra call volume caused by any such event is +20, then a resulting call volume of 220 results.

Then, a check is made to determine whether so-called intraday changes should be included into the further calculation, or not, step 440. An intraday change can be added only if current data is present for the day which is targeted for the forecast. This is a particular situation which is described with reference to FIG. 5, in which the columns indicate the historical average incoming call volume relating to respective 30 minute intervals on a sequence of fixed same days of a week, e.g., only Tuesdays. The thin line connects points corresponding to fixed forecast values and the thick line to intraday-corrected forecast values. In order to improve the clarity of the drawing the bottom part shows basically a subsection of the upper part, in a zoomed form. In this situation the volume forecast value which resulted from step 430 or 435 is multiplied by a particular normalized factor which is referred to as the intraday change factor.

Figure 5A:
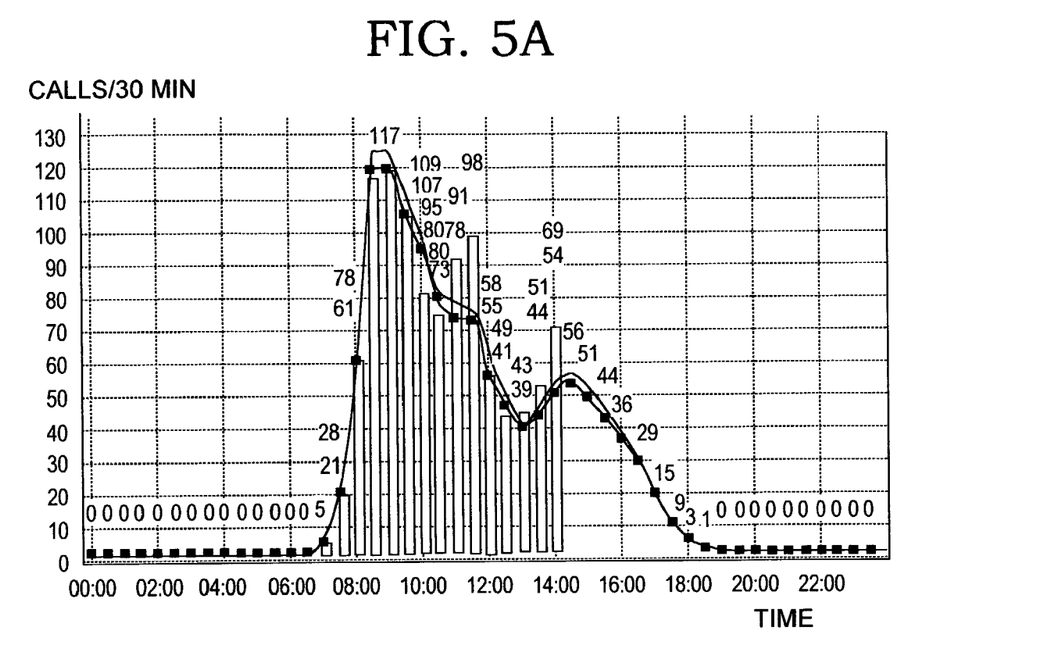
FIG. 5, upper part, shows the distribution of incoming calls on a 30-minutes base, calculated according to a preferred embodiment of the present invention; the bottom part shows a zoomed view.
Figure 5B:
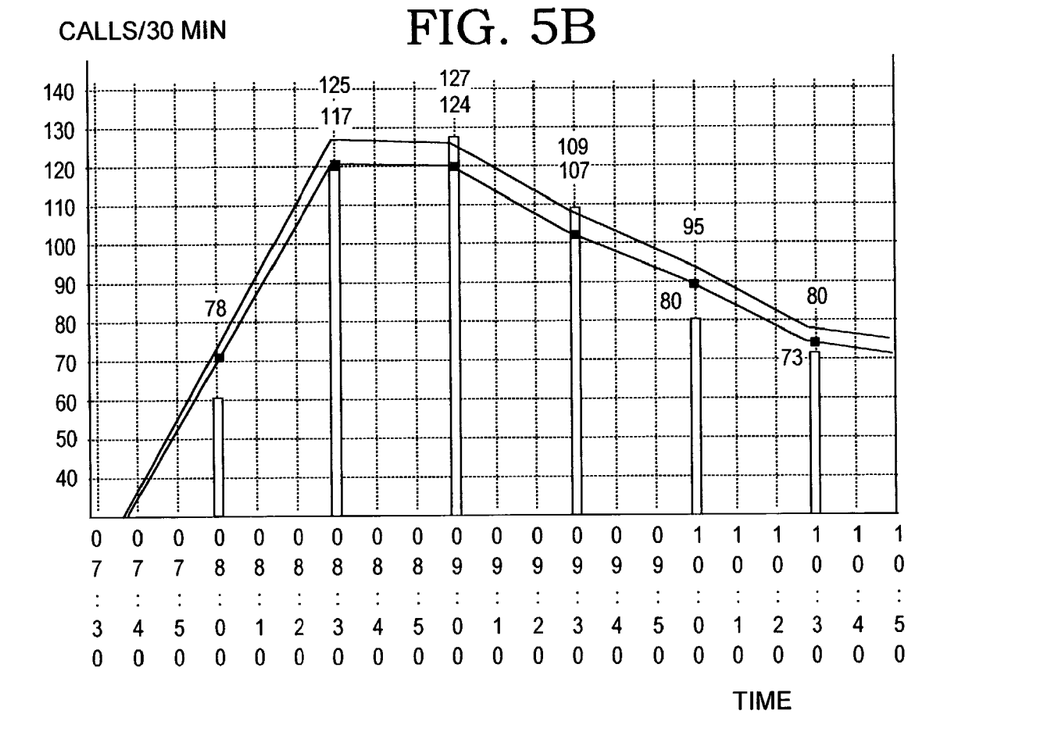

This factor is calculated by building the fraction of corresponding pairs of forecast values and freshly tracked real call volume data originating from the same day. Thus, for example, when the forecast value is 40 and the real call volume for the same half hour section is only 30, an intraday change factor of 30/40 is calculated. The same is done with the next half hour value pair, and so on until the current day time is reached. Then an effective intraday change factor is calculated, for example by calculating a mean value from all pairs. Differences due to different sign balance each other within the sum.

Or, a delta value may be achieved of e.g., +10 calls. This can be next normalized with the total average number of calls for Tuesdays, say this is a number of 80 calls. Thus a change of +10/80=12.5% is to be added to the current forecast data. This may be done by multiplying the current forecast data with a correction factor of 1.125.

Thus, a means may be added which is able to profit from the basic method as it was discussed with reference to FIG. 2 above, but which can be corrected or adapted in order to include an increased or reduced amount in call volume which was per se not foreseeable. Thus, network errors or network traffic restrictions which lead to a reduced volume of incoming calls can be included in the postponed calculation for staff planning purposes which in turn will be described with reference to steps 475 and higher.

It should be noted, that there is an additional option of excluding outlier data from the historical data used for interpolation of the straight lines of either the long time section or the short time section. This additional step can be interposed before step 410, for example. Eliminating outlier data may be done, for example by simply excluding such data from the base of data, or by replacing an outlier by the current arithmetic mean value calculated in turn without the outlier data, preferably.

In most cases a minimum value is found in the above-mentioned decision 420 which yields a good prediction value 25. It should be noted, however, that the preferred embodiment may be extended by a prior art algorithm in order to find a second minimum or a further one, if ever present. This additional function can, for example, be activated manually and should be observed by a management staff member in order to avoid a situation wherein time section time2 is too long and thus does not represent sufficiently the most recent past.

In parallel to running steps 405 to 440, steps 445 to 470 are run. These steps 445 to 470 yield the total time needed for servicing the incoming call volume forecast in the left branch of FIG. 4, between steps 405 and 440.

In order to do this, the same optimization scheme is proposed. Call duration data is extracted from respective data sets stored in the historical data base. Historical call duration data already includes the empirically found fact that the servicing time needed for a staff member in order to answer a call decreases as the call volume within a particular reference time interval increases. Thus, by basically applying the same evaluation of interpolation and calculation of standard deviation values, followed by a subsequent modification of the time 2 interval (see steps 450, 455, 460, and 465) a high quality forecast value can be provided in a step 470 which represents the total value of needed workload servicing time.

Optionally, the total servicing time in step 470 can be specifically forecast for any desired Backdesk working group, for example one of the Backdesk teams 1 to 5 shown in FIG. 1. The historical database specifies the respective data for each of the different Backdesk teams. Thus, the inventive method may be extended to precisely include a specific workload for a specific Backdesk team of specialists. This fact can be exploited for selectively providing additional staff only for the concerned Backdesk team if this is ever desired, or is forecast by a forecast program according to the invention. If even the staff member ID is tracked with the call data, further evaluations are possible.

Further and with reference to steps 475 to 491 the forecast calculation of staff will be described which is needed to cover a forecast call volume with a respective forecast servicing time.

It should be noted that the procedure via steps 477, 479 and 481 is a prior art method which uses input values provided by the inventive concept. The other branch, however, comprising steps 475, 487, 489 and 491, represents an inventive extension of the basic inventive method described above.

Thus, with reference to step 477 the prior art ERLANG C method can be performed with the basic forecast values of call volume and respective servicing time as input parameters. Further, a particular value of help desk accessibility can also be input into the ERLANG C method. Such accessibility requirements are often defined in contract documents between the User Helpdesk enterprise and a client enterprise. Thus, in a step 481 the number of staff members is calculated which is required for offering the contractually defined accessibility value for covering a forecast and expected workload, for example for the next week.

With reference to steps 487, 489 and 491 an improved staff calculation method will be described next below.

A precise forecast calculation of the staff required to cover all services for a whole year, or similar period of time such as six months or three months or even one month is essential for any enterprise when offering a call center service or any User Helpdesk. The inventive concept includes the creation of generic, mathematical expressions for the servicing time required for answering the total volume of incoming calls on the one hand, and on the other hand, the formation of a generic mathematical expression for a total time which is offered by the call center enterprise or the User Helpdesk enterprise for answering those calls and maintaining accessibility as agreed upon in an enterprise contract. Then, according to the invention those generic expressions are equated, which yields an equation. This equation is now solved for the variable describing the number of required staff members.

Thus, in more detail, the time period demanded by the total volume of incoming calls is as follows:

$$T\text{-demanded} = C\text{-incom} * t\text{-serv-call} * \text{learn}(t90) * \text{Err} \qquad (1)$$

with:

C-incom representing the call volume relating to a fixed time reference period, as e.g. one month. This period is also referred to as T-ref or tb herein, t-serv-call representing the average servicing time per call which—in absence of more elaborate strategies—can be proposed to be a mean value of the Frontdesk and Backdesk servicing time;

learn (t90) being a particular function proposed according to the invention to cover the effect of increasing skills, in which the essential parameter is the time period t90 which is defined as the average time required for providing an average Backdesk staff member to know 90% of the respective subject matter required for his respective task.

In a similar form the generic expression for the total time T-offered, offered by the UHD enterprise for answering the calls, is set up as follows:

$$T\text{-offered} = MA * T\text{-ref} * Ab(S,K,U)/100 * Anm(FD,BD) \quad (2)$$

in which MA is the number of required staff within the given reference time period T-ref, T-ref is the reference time period in which the number of incoming calls in expression (1) has come in, Ab(S,K,U) represents a normalized factor reflecting the average physical presence of staff members in dependence of training courses, illness and vacations.

Anm(FD,BD) is also a normalized factor reflecting the service efficiency of Frontdesk (FD) and Backdesk (BD) services, when answering calls. The Anm-factor is provided in order to reflect an operational potential of increasing the accessibility for the client without increasing the number of supported staff members. Thus, for example, an enterprise-specific phone call behavior comprising a catalogue of certain rules for welcoming a client, etc., or technical factors reflecting the speed of putting a client through from Frontdesk to a respective Backdesk staff member, or other business-specific support instruments can be modelled with this factor.

Thus, the basic equation in which both generic expression (1) and (2) are equated is as follows:

$$MA = (C\text{-incom} * t\text{-serv-call} * \text{lern}(t90) * \text{Err}) / (T\text{-ref} * Ab(S,K,U)/100 * Anm(FD,BD)) \quad (3)$$

Next, an exemplary setting of parameters will be listed, accompanied with sample values and the required dimension. Some further parameters are described in this exemplary context:

Number of incoming calls within T-ref: Cincom=300
Initial (maximum) servicing time per call—min: tmax=15
Accessibility as defined in contract—%: Err=95
T-ref for Number of incoming calls,—hours: tb=8
Illness average values—%: K=5
training courses—%: S=5
Vacations—% U=10
Efficiency for servicing calls, Frontdesk—%: Efd=85
Efficiency for servicing calls, Backdesk—%: Ebd=20
Fraction staff member of Frontdesk—%: Mfd=75
Time required for building up 90% Know-how in Help desk skills, Unit of Time, e.g. days: t90hd=365
Time required for building up 90% Know-how for User skills, Unit of Time, e.g. days: t90u=730
max. expected time saving by t90hd—min: thd=4
max. expected time saving by t90u—min: tu=1

When including learning effects either at the help desk side or at the user side an exponential function having a negative, reciprocal argument is assumed to be useful for reflecting reality. Thus, an initial value t-max is assumed to be required for servicing one call. A sample value is applied here of t-max=15 minutes.

The reference time tb or T-ref for measuring the number of incoming calls is here applied to be 8 hours, i.e. a regular working day.

The values applied for reflecting absence of staff members are all percentage values in relation to the total working time: K=5%, S=5%, U=10%.

The efficiency factors for servicing calls either in Frontdesk or Backdesk reflects the fraction of working time in which the respective staff members are actually occupied with answering incoming calls, i.e., speaking with clients. A sample value for the Frontdesk is assumed to be 85%, whereas a sample value for the Backdesk is assumed to be 20%. The low value for the Backdesk in relation to the Frontdesk is assumed to be realistic, because Backdesk work often requires a lot of additional work for post-processing incoming calls and preparing for future calls. Further, the parameter setting of EFD and EBD should include the additional consideration that there are nearly always idle periods of time for a Backdesk staff member which are caused by deviations from a uniform distribution of incoming calls seen over a day, and by the fact that a Backdesk staff member will in most cases be occupied a certain fraction of time with work resulting from different tasks or by preparation of particular work required for working on exceptional cases.

The fraction of staff members of Frontdesk/total staff is assumed to be Mfd=75%, thus indicating that 25% of staff members are working within the Backdesk.

Further, a sample value of 365 days is assumed to represent the time which is required for an unexperienced help desk staff member for building up 90% of a virtual know-how level for the Backdesk, t90hd=365 days.

Accordingly, the same is assumed to be true for the user side. Assuming a standard situation in which the normal user is not expert in the program supported by the User Helpdesk, the corresponding time t90u is assumed to be twice as large as t90hd, i.e. t90u=730 days.

Further, an assumption is made that the maximum time saving that may be expected by the introduction of t90hd is thd=4 minutes per call. A corresponding assumption for the user leads to tu=1 minute.

Next, effects of increased skills at the user side and at the help desk side is described in more detail with reference to its mathematical modeling approach according to an inventive embodiment.

As mentioned above the exponential function applied with a negative, reciprocal exponent can be expected to yield realistic results. Thus, the servicing time t-serv-call required for servicing a single call can be represented by the following expression:

(4)

$$T_{\text{serv\_call}}(t) := t_{\max} - t_{hd} \cdot \exp\left(t_{90hd} \cdot \frac{\ln(0.9)}{t}\right) - t_u \cdot \exp\left(t_{90u} \cdot \frac{\ln(0.9)}{t}\right)$$

Generally, training courses support knowledge and experiences that the staff member already has. When a training course covers truly new material, however, this will effect the average call answering time with a kind of step-overlay. The step is a step down at the time at which the training course is completed by a staff member, and is reflected thus in the desired increased efficiency of daily work. The following algorithm reflects this behavior:

$$T_{serv\_call}(t) := t_{max} - t_{hd} \cdot \exp\left(t_{90hd} \cdot \frac{\ln(0.9)}{t}\right) - \quad (5)$$
$$t_u \cdot \exp\left(t_{90u} \cdot \frac{\ln(0.9)}{t}\right) - \text{if}(t > t_{ux}, 1.5, 0)$$

in which tux is the time at which the training course is terminated and in which the expected time saving td is 1.5 minutes. When tux is set to 200, for example, which means that at the 200$^{th}$ day of a year thus, on some day within the month of July the training course is terminated.

This approach can be extended to cover more than a single training course. For example, three training courses can be represented by:
td=(0,7 1 0,5)$^T$
tux=(100 150 200)$^T$;

in which transposed vectors are used for arguments of the sum. This is described by:

Equation (6)

$$T_{serv\_call}(t) := t_{max} - t_{hd} \cdot \exp\left(t_{90hd} \cdot \frac{\ln(0.9)}{t}\right) - \quad (6)$$
$$t_u \cdot \exp\left(t_{90u} \cdot \frac{\ln(0.9)}{t}\right) - \sum_{j=0}^{2} \text{if}(t > t_{ux_j}, t_{d_j}, 0)$$

Figure 6:
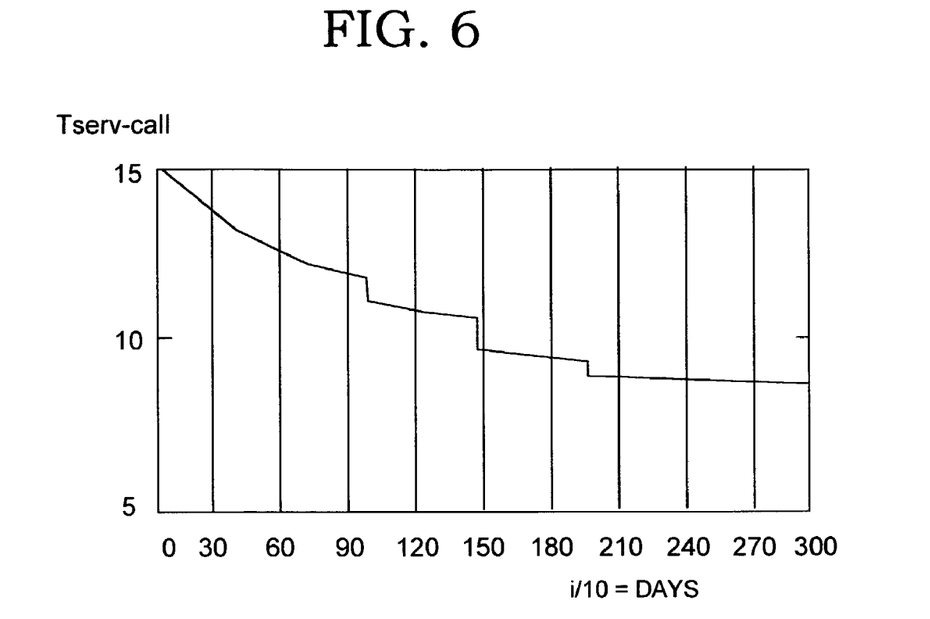
FIG. 6 is a schematic representation illustrating the stepped decrease in required call answering time due to increased staff skills and training courses.
Figure 7:
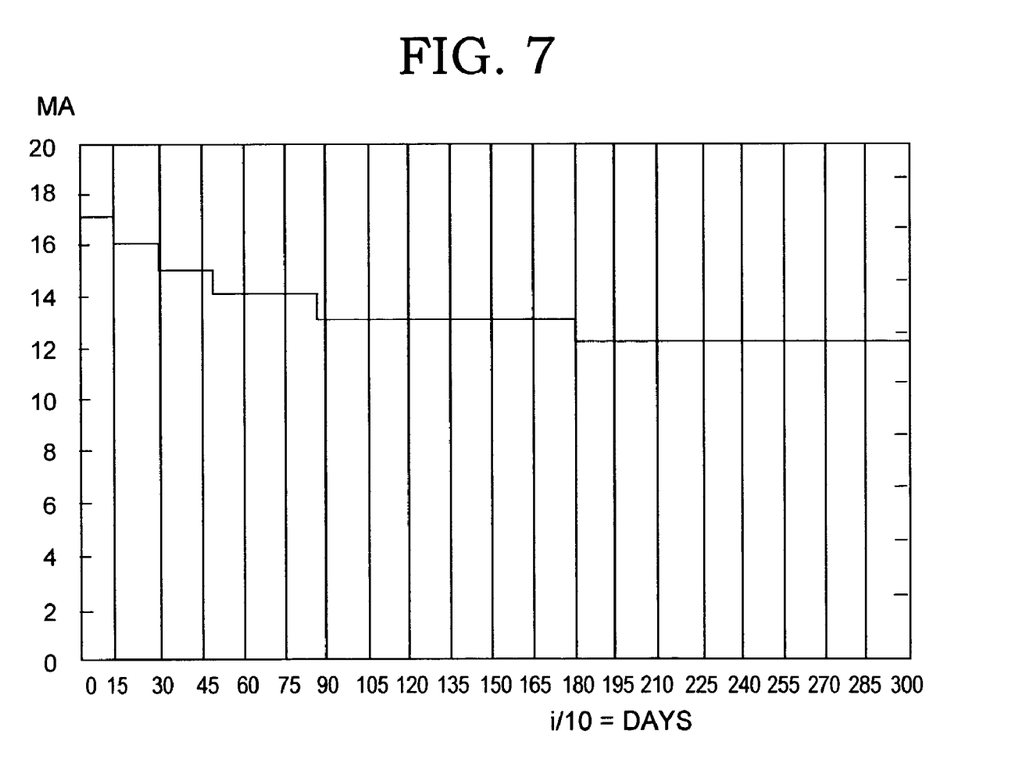
FIG. 7 is a schematic representation illustrating the stepped decrease in required staff due to training courses.

From this algorithm the graphical representation given in FIG. 6 results, in which an overall decrease in average servicing time T-serv-call can be seen. The decrease has two elements: first by steps, due to the training courses completed by the staff doing, and second, by a steady decrease due to the steadily increasing skill of staff and client staff. It should be added that the auxiliary variable 'i', depicted in FIGS. 6 and 7 is introduced just for programming convenience. This independent variable i runs from 0 until 3000, with correspondingly i/10 running from 0 to 300. A step of i/10 corresponds to a one-day time interval. Thus, in FIG. 6 the vertical lines define a time length of 30 days, i.e., approximately a one month interval. In FIG. 7, this is a half-month interval. Thus, FIG. 6 shows a 300 day period, in which the average call time decreases by about 50%.

The following "Helpdesk Formula" represents an exemplary algorithm which implements the above described effects, whereby Cin=Cincom, tm=t-max, and E=Err.

Helpdesk Formula $$MA(t) := \frac{C_{in} \cdot \left(t_m - t_{hd} \cdot \exp\left(\frac{t_{90hd} \cdot \ln(0.9)}{t}\right) - t_u \cdot \exp\left(\frac{t_{90u} \cdot \ln(0.9)}{t}\right) - \sum_{j=0}^{2} \text{if}(t > t_{ux_j}, t_{d_j}, 0)\right) \cdot E \cdot 10^4}{t_b \cdot 60(100 - K - S - U) \cdot [E_{fd} \cdot M_{fd} + E_{bd} \cdot (100 - M_{fd})]} \quad (7)$$

in which tdj represents the expected time saving of each training course j.

The result of Helpdesk Formula (7) may be rounded in order to yield an integer value for the number of required staff.

FIG. 7 represents the required staff developing over a period of 300 time units with an increase in efficiency due to training courses. A decreasing number of staff is required to cover a constant call volume. The decreasing steps are basically caused by five training courses which are taken by the staff members.

The algorithm represented by equation (7) assumes a uniform distribution of incoming calls. According to an additional, preferred aspect of the algorithms of the present invention, an extension is proposed and disclosed herein in order to reflect the peaks in the real workload day distribution, or peaks of incoming call distribution. A peak is characterized by its duration, i.e. its length and its height, i.e. its amplitude.

One of the preceding expressions (5), (6) or (7) can now be applied in order to yield the additional staff required for covering a peak. The amplitude of the peak represents the additional number of incoming calls. The peak length is represented by the respective reference time T-ref which is depicted in the algorithm as tb.

Thus, sequentially applying one of the above formulae yields the additional required staff, separately, for each peak.

In the foregoing specification the invention has been described with reference to a specific exemplary embodiment. It will, however, be evident that various modifications and changes may be made thereto without departing from the broader spirit and scope of the invention as set forth in the appended claims. The specification and drawings are accordingly to be regarded as illustrative rather than limiting.

It should be noted that the inventive concepts disclosed above may be included in staff schedule planning tools which include planning of several work shifts. In particular, the invention includes covering a permanently re-occurring peak in workload by overlapping the staff members of two adjacent work shifts.

Further, the inventive methods are also applicable to distributed, networked Call center or Helpdesk configurations as well, which may be implemented without human interaction being required during tracking, storing and evaluation steps. The inventive concepts can be easily extended to include an automated issue of a request for more staff temporarily needed to fill a gap between currently needed and currently existing staff. The issue can for example be generated when the Backdesk staff has too much work and the call counter for incoming calls determines that many incoming calls exist which cannot be serviced sufficiently quickly. Thus, a request can be automatically sent out to a plurality of currently idle Backdesk staff members as an e-mail message, a phone call or a Short Message via mobile communication in order to inform some additional staff to fill the gap quickly.

The present invention can be realized in hardware, software, or a combination of hardware and software. A forecast tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

Further, it can be realized in a telephone communication network having a plurality of end-user associated phone devices, and a programmable server telephone device having implemented a computer program for collecting and storing statistical data about incoming calls. Then the step of data evaluation may be done external to the server device via an adequate read interface.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following:

a) conversion to another language, code or notation;
b) reproduction in a different material form.

I claim:

1. A computerized method for managing a workload of a user helpdesk or a call center that varies by time of day and by day of week, the method comprising:
    calculating a first amount of user-initiated requests to one of a user helpdesk or a call center by at least one computer system using historical data associated with a particular time of day and a particular day of week covering an earlier section of history;
    calculating a second amount of user-initiated requests to the one of the user helpdesk and the call center by the least one computer system using historical data associated with the particular time of day and the particular day of week covering a later section of history;
    comparing the second amount by the least one computer system to a predetermined value;
    varying the length of the later section of history by the least one computer system to result in a second later section of history of user-initiated requests to the one of the user helpdesk and the call center in response to a result of the comparison such that the second later section of history is longer than the later section of history; and
    calculating a third amount of user-initiated requests to the one of the user helpdesk and the call center by the least one computer system using historical data covering the second later section of history;
    combining the first amount and the third amount by the least one computer system to yield a request workload forecast value;
    calculating a duration of request servicing times for the one of the user helpdesk and the call center by the least one computer system using historical data associated with the particular time of day and the particular day of week covering a second earlier section of history;
    calculating a second duration of request servicing times for the one of the user helpdesk and the call center by the least one computer system using historical data associated with the particular time of day and the particular day of week covering a third later section of history;
    comparing the second duration by the least one computer system to a second predetermined value;
    varying the length of the third later section of history by the least one computer system to result in a fourth later section of history of request servicing times for the one of the user helpdesk and the call center in response to a result of the comparison to the second predetermined value such that the fourth later section of history is longer than the third later section of history;
    calculating a third duration time by the least one computer system using historical data covering the fourth later section of history;
    combining the first duration and the third duration by the least one computer system to yield a servicing time workload forecast value;
    calculating an amount of resources needed for covering a resources forecast workload value based on the request workload forecast value and the servicing time workload forecast value by the least one computer system;
    providing an indication of the amount of resources needed to a display of the least one computer system.

2. The method according to claim 1 further comprising the steps of:
    repeatedly storing current workload data; and
    repeatedly updating workload forecast values by integrating said current workload data into calculations of a future workload.

3. The method according to claim 1 further comprising the steps of:
    generating a present/past fraction in which current-day real workload data is set in relation to respective historical data taken as an average over a predetermined historical time section, and
    multiplying the forecast values by said present/past fraction in order to yield future workload data.

4. The method according to claim 1 wherein the
    calculating the amount of resources needed for covering the forecast workload value comprises equating generic expressions for
    resources demanded for servicing the forecast workload and resources offered for handling the workload.

5. The method according to claim 1, in which said resources comprise at least one of staff and devices needed to handle incoming calls in a call-center.

6. The method according to claim 4, in which said resources are staff and devices needed to handle incoming calls in a User Help Desk.

7. The method according to claim 4, further comprising the steps of:
    repeatedly collecting current call statistical data from a plurality of respective communication devices provided for staff members;
    storing said call statistical data in a database; and
    evaluating said data for forecast purposes.

8. The method according to claim 1, further comprising the step of:
    excluding outlier data within said historical workload data, lying out of a predetermined tolerance limits, from regression analysis.

9. The method according to claim 1, further comprising the step of:
    including foreseeable events into the calculation of workload forecast, said foreseeable events causing additional fluctuations overlying the forecast workload.

10. The method according to claim 4, further comprising the step of:
    including a model parameter into a mathematical workload forecast algorithm that simulates effects of training-based, increased staff efficiency in servicing incoming calls.

11. The method according to claim 4, further comprising the step of:
    including a model parameter into a mathematical workload forecast algorithm that reflects actual availability of a staff member for servicing incoming calls.

12. The method according to claim 4, further comprising the step of:
    including a model parameter into a mathematical workload forecast algorithm that reflects length and amplitude of peaks beyond a uniform distribution within a daily workload distribution.

13. The method according to claim 1 wherein the comparing comprises comparing a standard deviation of the second analysis result and the predetermined value comprises an initial value.

14. The method according to claim 1 further comprising comparing the third analysis result to a second predetermined value.

15. The method according to claim 14 wherein the comparing the third analysis result to a second predetermined value comprises comparing a standard deviation of the third analysis result to a standard deviation of the second analysis result.

16. The method of claim 1 further comprising determining whether an exceptional event is planned for the particular time of day and the particular day of week and adjusting the combined workload forecast value based on the exceptional event.

17. The method of claim 1 wherein the user-initiated requests comprise at least one incoming call.

18. The method of claim 1 wherein the user-initiated requests comprise at least one incoming electronic message.

19. The method of claim 1 wherein the request servicing times comprise call durations.

20. The method of claim 1 wherein the combining the first amount and the third amount, and the combining the first duration and the third duration, are performed in parallel relative to each other.

* * * * *